J. N. COFFIN.

Lamp.

No. 537.

Reissued March 16, 1858.

R. PETERS, Photo-Lithographer, Washington, D. C.

UNITED STATES PATENT OFFICE.

ISAAC N. COFFIN, OF WASHINGTON, DISTRICT OF COLUMBIA.

LARD-LAMPS.

Specification forming part of Letters Patent No. 16,825, dated March 17, 1857; Reissue No. 537, dated March 16, 1858.

*To all whom it may concern:*

Be it known that I, ISAAC N. COFFIN, of Washington, in the District of Columbia, have invented a new and useful Improvement in Lard-Lamps; and I do hereby declare that the following is a full, clear, and exact description of the construction and operation of the same.

The nature of my invention consists in the arrangement of two flat lamp-tubes with the cap of the lamp so as to form a hot-air chamber of the three, the inner sides of which three are heated by the flames of the wicks, which hot-air chamber will heat the air supplied to the flame of the lamp, and thereby burn the smoke; also, in forming the lower side of the hot-air chamber into a concave reflector which reflects back the heat, which is radiated down from the flame, back into the flame, on the sides of the hot-air chamber, and on the wicks, all which above-mentioned arrangements enable in its construction the omission of all the usual devices, in lard-lamps called "heaters," and the omission of all the usual devices in lard-lamps for raising lard up to the wick, where it can be melted—such as pistons, screws, &c.

To enable others skilled in the art to make and use my invention, I will proceed to describe its construction and operation.

I construct my lamp by the arrangement of two flat tubes with the cap of the lamp, the tubes placed through the cap at right angles to each other at such a distance apart from each other that when inclined toward each other and fixed in position their upper ends are three-sixteenths of an inch apart, by which arrangement of the flat tubes with the lamp-cap I form a hot-air chamber inclosed on three sides, with the exception of the very narrow orifice at the top, caused by the upper ends of the tubes being three-sixteenths of an inch apart. The top of the lamp I form into a concave reflector or solder a concave reflector, on a common lamp-top.

Figure 1:
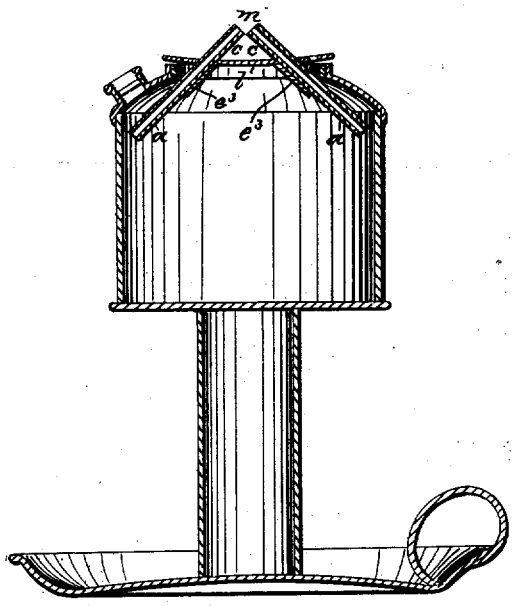
Figure 2:
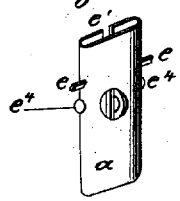

Figure 1 in the accompanying drawings exhibits the structure of the hot-air chamber, in which *c c* are two inner sides of it, formed by the wick-tubes *a a; i*, the concave reflector, which forms the third side of it; and *m*, the narrow orifice at top in it, (the hot-air chamber.) Fig. 2 exhibits a perspective of one of the wick-tubes detached.

The wick-tubes are loose in the concave reflector, and can be readily withdrawn from the lamp for filling, cleaning, &c. The wick-tubes are provided with small projections or lugs, Fig. 2, *e e*, by which they are checked and held in place, the lugs resting on the concave reflector. The wick-tubes have a slit from top to bottom, $e'$, and an opening, $e^2$, the more freely to admit the lard to the wick.

In order to preserve the inclination and position of the wick-tubes, they are supported by strips or wings of metal, $e^3$ $e^3$, attached firmly to the under side of the cap, and inclined to each other at the same angle with the tube—viz., a right angle. The little projections $e^4$ $e^4$ on the edges of the wick tubes aid in preventing the wick-tubes from being drawn upward when picking up the wick. It will be seen that from the position of the concave reflector relatively to the tubes that the heat radiated from the flame on the concave reflector will be reflected back on the inner sides, *c c*, of the hot-air chamber; that the heat will be reflected on the wicks, on the lard, which boils up in foam on the wicks, on the air which ascends through the hot-air chamber, on the vapor of the lard, and on the flame. By this arrangement of these tubes and the cap of the lamp into a hot-air chamber the atmospheric air in the hot-air chamber, whose tendency, when heated, is to ascend in an exactly perpendicular direction, is pressed against the hot inner sides of the hot air chamber in its attempts to rise vertically at the usual atmospheric pressure of at least fourteen pounds on the square inch. By this pressure and abrasion of the air against the heated sides of the hot-air chamber it is constantly acquiring, in the minutest steps of its ascension, greater and greater heat by pressing against hotter and hotter portions of the hot-air chamber till at last it is wire-drawn through the extremely hot sides of the orifice. By the action of this hot-air chamber in bringing the powerful aid to the heat of the flame of this intensely-heated air to conjointly act on the vapor of the lard the combination becomes very thorough, a supply of hot oxygen is afforded to the vapor, which dissolves it entirely into gas, and thus the smoke is entirely consumed and turned into flame, giving added light. From these actions a very intense combustion and heat is produced, by which all the material is consumed instead of part being wasted and lost in disagreeable and unhealthy smoke, which heat reacts on the hot-air chamber, making it still hotter for the heating of the air in it, and also imparts a high degree of heat to the other parts of the tubes, which thereby convey heat to the lard, thus continuing the lard in a melted state, and thereby enabling it to be drawn up the tubes. Lard being a very viscid substance requires a very strong heat and highly-heated air to burn it without smoke, and both of these important requisites I am enabled to give it by the hot-air chamber above described, thereby dissolving all the vapor and smoke into combustible gas and into flame.

By constructing my lamp with the hot-air chamber above described I am enabled entirely to omit a heating wire or strip of metal, called a "heater," so common in lard-lamps, the objections to which are that it materially obstructs the supply of air and the shadow cast by it, and its refrigerating effect upon the flame render lard-lamps useless; and I also am enabled entirely to omit all devices—such as pistons, screws, &c.—for raising the lard to the wick, the objections to which are that the complications of such contrivances and their liability to get out of order render lard-lamps too expensive. I am enabled by this hot-air chamber to burn lard in cold weather with success.

To operate or use this lamp, I melt a little lard in a cup or other convenient vessel by setting it on the fire or holding it over the flame of a lamp and pour it on that which is cold, and at the same time set the lamp down by the fire for a short time to fuse that which is on the wick and in the tubes. I trim the top of the wicks by pressing against them the flat side of a pair of scissors, which bends them to a vertical position and widens the space between them, and when a sufficient length of wick projects from each tube the wicks do not join, but allow the passage of the hot air passing up between the two tubes and between the two wicks from the hot-air chamber below.

What I claim as my invention, and desire to secure by Letters Patent, is—

1. The combination of the hot-air chamber, which is formed by the arrangement of flat inclined wick-tubes, in the manner above specified, with the lamp-cap.

2. The combination of the flat inclined wick-tubes with the concave reflector, as above described, for the purposes above mentioned, my invention having special reference to a lard-lamp.

ISAAC N. COFFIN.

Witnesses:
THOMAS C. DONN,
WM. J. PARHAM.